July 21, 1953
C. W. BREUKELMAN
2,646,127
WELL FORMATION TESTING TOOL
Filed Feb. 1, 1947
3 Sheets-Sheet 1
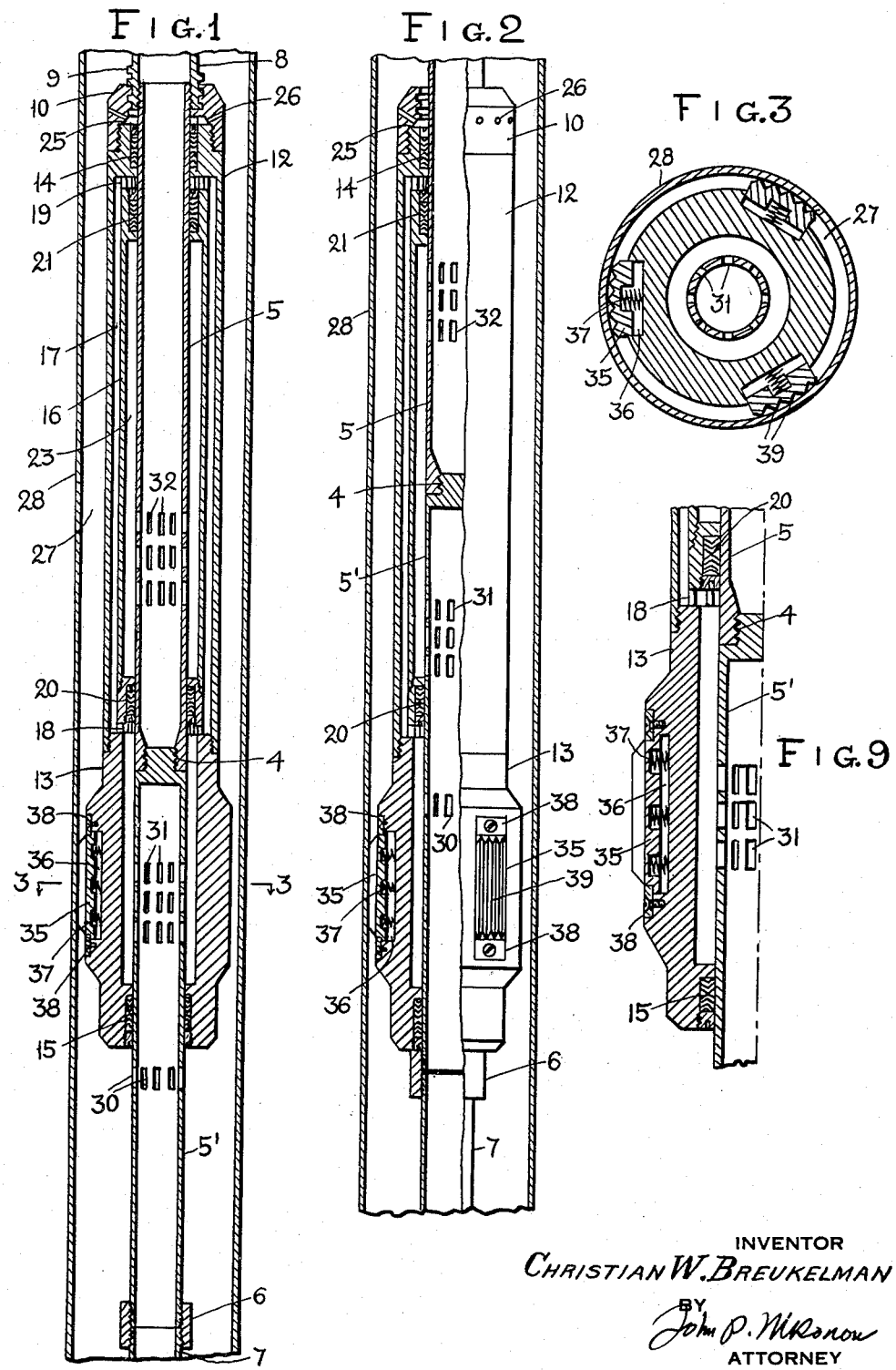
INVENTOR
CHRISTIAN W. BREUKELMAN
BY
John P. McRonow
ATTORNEY July 21, 1953
C. W. BREUKELMAN
2,646,127
WELL FORMATION TESTING TOOL
Filed Feb. 1, 1947
3 Sheets-Sheet 2
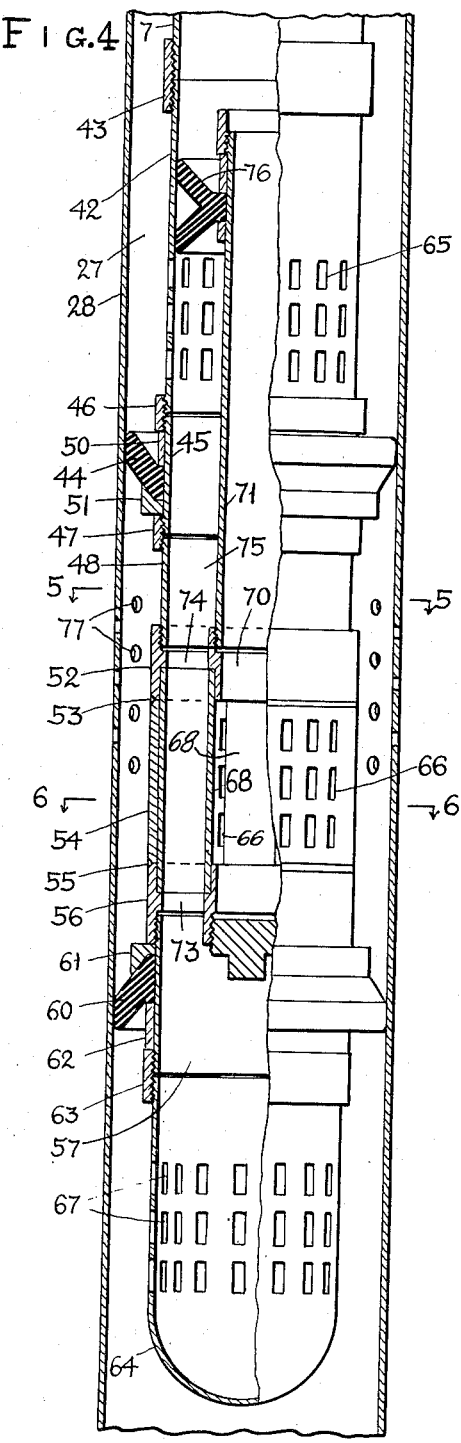
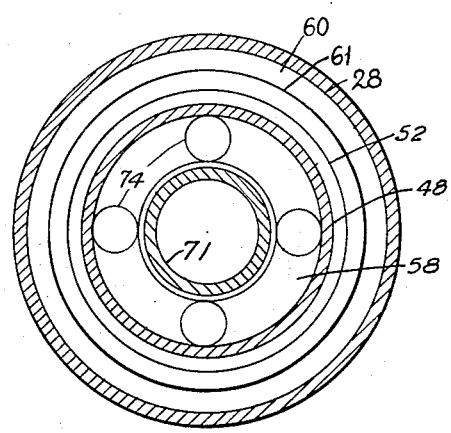
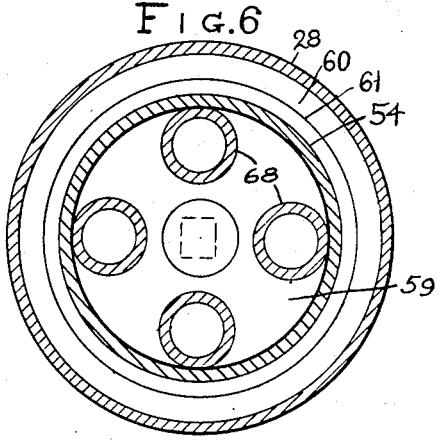
INVENTOR
CHRISTIAN W. BREUKELMAN
BY
John P. Kilronon
ATTORNEY July 21, 1953  C. W. BREUKELMAN  2,646,127
WELL FORMATION TESTING TOOL
Filed Feb. 1, 1947  3 Sheets-Sheet 3

INVENTOR
CHRISTIAN W. BREUKELMAN
BY
John P. Wilson
ATTORNEY

Patented July 21, 1953

2,646,127

UNITED STATES PATENT OFFICE 2,646,127

WELL FORMATION TESTING TOOL

Christian W. Breukelman, Bogota, Colombia

Application February 1, 1947, Serial No. 725,813

2 Claims. (Cl. 166—11)

My invention relates to and has particular reference to devices for taking samples of oil, gas, or other substances from different horizons in an oil well, and to valves for controlling the flow from the testing device.

My invention has for its object to provide a device for withdrawing a fluid through openings, and particularly for production testing of porous formations in wells in which casing pipes have been inserted, and cemented in place, and gun-perforated at various levels for determining the best producing horizons. The tool for this purpose comprises a tubing introduced into the casing to a level which it is desired to test, and the fluid is withdrawn through the tubing from this level.

Conventional testing devices have a disadvantage in that it is necessary to plug the casing by cement or other device after each test, starting from the bottom of the well, to prevent the fluids from the lower levels from mixing with the fluids from a selected level. Upon completion of the tests, the plugs must be drilled out, which work consumes much time and labour.

In my improved tester, I provide means to isolate and test any selected horizon, so that the successive horizons can be more or less rapidly gun-perforated and tested without inserting any plugs in the casing pipe.

Another object of my invention is to provide a device which can be used for obtaining a continuous flow of the fluid from a selected horizon, while preventing the fluid from other horizons from flowing through the testing tube.

Another object of my invention is to provide a testing device with improved intake and by-pass ports which are not readily clogged or obstructed by solid matter passing with the fluids.

Another object of my invention is to provide a method of testing the productivity of a selected formation in a well containing a continuous column of fluid in which the selected formation is isolated and the pressure against such formation reduced by an amount sufficient to induce flow therefrom while maintaining the hydrostatic pressure and the continuity of the column of fluid above and below such formation.

Another object of my invention is to provide a control valve which prevents flow of fluid into the tubing, and equalizes the hydrostatic pressures inside and outside the testing device while it is being lowered into, or withdrawn from the well, whereby the wear of the sealing swabs between the testing device and the casing pipe is reduced to a minimum.

If the above mentioned pressure equalizing feature is not provided, conventional rubber swabs used for this purpose wear out very rapidly, often during a single insertion of the testing tool into the casing pipe, because of the roughness of the casing pipe, particles of cement adhering to the inner surface, and a large number of pipe joints which must be traversed by the swabs while the latter are subjected to a heavy differential pressure.

Still another object of my invention is to provide an improved control valve for the testing device whereby the valve can be easily operated from the top of the well even under heavy hydrostatic pressures.

The foregoing and other objects and features of my invention are more fully described in the accompanying specification and drawings in which:

Fig. 1 is a sectional elevational view of my valve used with a production testing device shown in a closed position;

Fig. 2 is a similar view showing the valve in an open position;

Fig. 3 is a detail sectional view taken on the line 3—3 of Fig. 1 on an enlarged scale;

Fig. 4 is a sectional elevational view of my production testing tool which may be used with my valve;

Fig. 5 is a sectional view taken on the line 5—5 of Fig. 4;

Fig. 6 is a sectional view shown in the line 6—6 of Fig. 4;

Fig. 9 is a detail view on an enlarged scale of a portion of the valve construction.

Figure 7:
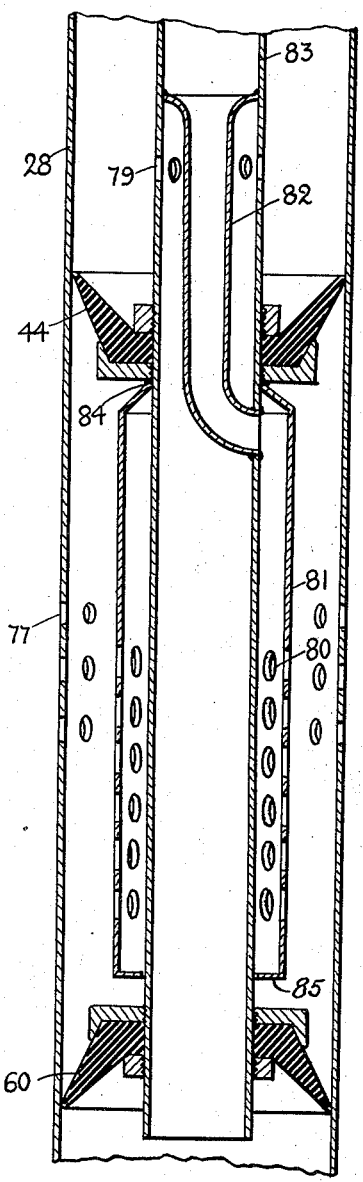
Fig. 7 is a diagrammatic fractional sectional view of a modified testing tool.

My valve as shown in Figs. 1 to 3 inclusive comprises a central flow pipe consisting of an upper portion 5 and a lower portion 5'. The portion 5' is closed at the upper end and is threaded at 4 into the upper portion 5. The remote ends of the portions 5 and 5' respectively are threaded and the lower end of portion 5' is provided with a threaded coupling 6 for attaching it to the upper end of a pipe or flow tube 7 of the production testing tool shown in detail in Figs. 4 to 6 inclusive. The upper end of the portion 5 is threaded at the top for connection to the lower end of an extension pipe 8 which may comprise several sections connected by conventional couplings and reaching to the top of the well. The lower end of the extension pipe 8 is provided on the outside with square threads 9 detachably engaging a bushing 10 threaded on the upper end of an outer sleeve 12 of the valve. The square threads make it possible at will to engage or to disengage the pipe 8 from the valve outer sleeve 12 while retaining its connection with the central flow pipe portion 5. Such a detachable connection is necessary to manipulate the valve as will be explained more fully below. It should be noted that other conventional detachable connections may be employed for this purpose, such as a bayonet joint, instead of the square threads.

The sleeve 12 is threaded on the upper end of a tubular cage 13. The sleeve 12 and the cage 13 are slidably fitted on the flow tube 5 and are provided with oil and gas resisting packings 14 and 15 respectively. An inner sleeve 16 is placed inside the outer sleeve 12 and is spaced inwardly therefrom to provide the balancing annulus 17 which serves to equalize the pressure at the end portions of the inner sleeve. The ends of the inner sleeve 16 are serrated at 18, 19 providing a passage for a fluid from the pipe portion 5' to both ends of the inner sleeve 16 to balance the pressure on packings 20, 21 at the ends of the sleeve 16. A further balancing is obtained by providing an annular clearance 25 between the interior of the bushing 10 and the exterior of the upper end of the pipe portion 5 with ducts 26 extending through the bushing 10 to the outside into an annulus 27 between the outer sleeve 12 and a casing pipe 28 in a well. An inner flow annulus 23 is formed between the exterior of the flow pipe portion 5 and the interior of the inner sleeve 16.

The inner flow pipe portions 5, 5' are provided with ports 30, 31 and 32. Ports 30 are positioned below the lower end of the cage 13, and the ports 31, 32 are positioned respectively below and above the seal 4 between the pipe portions 5, 5', when the pipe 8 is connected with the valve sleeve 12 through the bushing 10 as shown in Fig. 1. Ports 31 and 32 are also located on opposite sides of the packing 20 when the parts are in the position shown in Fig. 1, thus effectively preventing any flow of a fluid in the well from below the valve up through the pipe portions 5' and 5 into pipe 8. In this position of the valve, it can be lowered into a well to a desired horizon without causing any fluids to flow through the pipes 5 and 8.

The cage 13 is provided with friction blocks 35, preferably three such blocks being slidably fitted in corresponding slots 36 in the cage 13 as shown more clearly in Figs. 3 and 9. Springs 37 urge the blocks outward, and plates 38 secured to the cage limit the outward movement of the blocks by engaging the edges of the block. The plates are so mounted that the springs will be operative to urge the blocks against the casing pipe for all normal variations in the particular diameter of the latter. The blocks are provided with longitudinally extending sharp edges 39 frictionally engaging the casing pipe and preventing the rotation of the cage 13 relative to the casing pipe while frictionally hindering the up and down movement of the cage.

When it is desired to test the flow from a well, the valve with the test tool 7 attached thereto is lowered into the well to a desired horizon. The pipe 8 is then rotated until it is freed from the outer sleeve 12 and is raised to a height corresponding to the distance between the coupling 6 and the lower end of the cage 13. During this movement, the cage 13 will remain stationary, being retained by the friction of the blocks 35 against the casing pipe 28. The final position of the parts is shown in Fig. 2. It may be noted that with the parts in this position flow is possible from the well through the pipes 7, 5', ports 31, annulus 23, and ports 32 into the pipes 5 and 8. At the same time, the fluid will pass through the balancing ports 30 and between serrations 18 into the balancing annulus 17, and between serrations 19 to the upper end of the packing 21, thus equalizing pressures below the packing 20 and above the packing 21 and permitting the outer assembly to move down along the flow tube 5, 5' even when there is no fluid in the tubing and a great hydrostatic pressure outside the tool.

My testing tool as shown in Figs. 4 to 6 inclusive comprises an upper by-pass screen sleeve 42 connected by a coupling 43 to the pipe 7 extending to the valve described above. The screen sleeve 42 is provided with a rubber sealing swab 44 mounted on a short tube 45 connected by couplings 46, 47 to the upper sleeve 42 and to its lower portion 48 respectively. The lower portion of the coupling 47 has left hand threads to facilitate the removal of the upper half of the tool if it becomes stuck by sand. The lower portion can be subsequently removed after washing out the sand. The swab 44 is preferably of a self-sealing type, of a conical shape so that it expands and tightly engages the inner wall of the casing 28 when a hydrostatic pressure is applied to the swab from above. The swab is held in place by a sleeve 50 and a thimble 51. The lower sleeve portion 48 is threaded into an upper by-pass bushing 52 welded at 53 to an intermediate flow tube screen 54. The lower end of the screen 54 is welded at 55 to a lower by-pass bushing 56 into which a short tube 57 is threaded, carrying a lower rubber sealing swab 60 supported between a thimble 61 and a sleeve 62. Bushings 52 and 56 are substantially identical annular members having radially spaced inner and outer tubular parts joined by partitions 58 and 59, the outer tubular parts of these bushings being welded to the opposite ends of the screen 54 respectively. A plurality of by-pass tubes 68 are fitted at their ends into the upper and lower by-pass bushings 52 and 56. Holes 73, 74 are provided in the partitions in the bushings, for receiving the tubes 68. These tubes 68 and holes 73, 74 provide communication between the tube 57 and the annulus 75 which is formed by and located between the tube 48 and an inner flow tube 71 located within the tube 48. The lower end of the short tube 57 is connected by a coupling 63 to a lower by-pass screeen 64 closed at the lower end. The screens 42, 54 and 64 are provided with a plurality of elongated slots 65, 66 and 67 respectively. The total area of the slots and their number can be made relatively large so that the passages cannot be clogged by solid particles and, also, they will afford a free flow of the heavy fluid (usually drilling mud) through the device when it is lowered or raised in a well.

The by-pass tube assembly comprising bushings 52 and 56, screen 54 and tubes 68 is preferably placed just above the lower casing swab cup. Then if sand settles out between the casing and the cups, it can easily be removed by pumping fluid down the tubing, out through the flow tube screen, and past either or both of the casing swab cups up the casing. Otherwise, sand would tend to settle by gravity on top of the lower casing swab cup, preventing the removal of the tool.

The central hole through the bushing 56 is closed by a plug.

The upper by-pass bushing 52 is provided with a central hole 70 into which the lower end of the flow tube 71 is threaded. The upper end portion of this flow tube is provided above slots 65 with a sealing rubber swab 76 preferably of a double type, or two cups placed back to back and facing in opposite directions so that any hydrostatic pressure in either direction tends to seal the junction between one of the cups and the wall of the upper screen sleeve 42. The simplified connection of the flow tube makes it possible to lengthen this tube if it is desired to increase the distance between the swabs.

The operation of my tool is as follows:

The testing tool attached to the lower end of the valve is lowered into the casing pipe on the extension pipe 8, the latter being locked to the bushing 10 by the threads 9. The introduction of the tool into the well will not be hindered by the presence of drilling mud or other fluid which may fill the casing pipe, because the fluid in the well will readily flow through holes 67 in the lower screen 64, tube 57, by-pass tubes 68, and holes 73, 74, annulus 75, and through the slots 65, into the upper annulus 27 between the tool and the casing pipe 28. Due to the large size and number of the slots in the screen tubes, the passage of the fluid will be restricted to a minimum extent, and the swabs being relieved of excessive fluid pressure, will slide readily over the inner surface of the casing tube, and not suffer any excessive wear due to this cause.

Since the control valve is closed during passage into a well, and the balancing port 30 is in the open position below cage 13 when the testing tool is lowered into the well, there is practically no tendency for fluid to flow into the testing tool from the space between the sealing swabs 44, and 60. These swabs, being hydrostatically balanced by this design, are relieved of any pressure which would be present due to unbalanced hydrostatic pressures inside and outside the testing tool if no control valve were provided, and their wear due to this cause is eliminated.

The testing tool is lowered to a desired level where for instance, the casing has been shot-perforated at 77, and the perforated portion is straddled by the swabs 44, 60. It is assumed that the well is filled with a heavy liquid such as drilling mud, which in the absence of a testing tool will prevent the entry of a fluid from the casing perforations into the casing.

My construction of the testing tool is especially favorable for the unimpeded flow of fluid. A large number of ports in the form of elongated screen slots makes it practically impossible for the slots to be clogged by any solid particles in the fluid; large by-pass tubes 68 also provide a large flow area. Such a free flow of the casing fluid also tends to maintain a uniform pressure at all points in the casing so that there is no danger of the lighter fluids in the well from escaping through the shot-perforations until the valve is opened. Hence, the tool can be moved past several perforated places and stopped at a desired place where it can be sealed by opening the valve as will be explained below.

The valve during the insertion of the tool is locked at 9 to the extension pipe 8 as shown in Fig. 1. The hydrostatic pressure on the sealing packing 20, 21, 14 is balanced by the well liquid passing through the equalizing ports 30 and out through the slots 31 and between the lugs 18 into the balancing annulus 17 from which it reaches the upper seals 14, 21 through the slots between the lugs 19. Such a balancing will facilitate the opening of the valve as follows:

The pipe 8 is turned to the left for unscrewing its lower end with the square threads 9 from the upper end of the valve. The latter will be prevented from the rotation by the friction blocks 35. The pipe 8 with the flow tubes 5, 5' is then raised a little, enough to bring both sets of the screen ports 31, 32 into a position opposite the annulus 23 as shown in Fig. 2, thus establishing a communication between the pipe portions 5 and 5' and by-passing the closed end 4 of the pipe 5'. The valve sleeve will be prevented from movement by the friction of the blocks 35 against the casing. It is understood, of course, that the distance between the swabs of the testing tool 44 and 60 is such as to allow for such movements without displacing the swab-enclosed tool portion from the zone of the perforations.

The equalizing holes 30 are located near the lower end of the cage 13 when the cage is in its uppermost position, so that they are closed by the cage before the connection between the pipe portions 5 and 5' is established.

The provision of the equalizing annulus 17 and ports 30 makes it possible to effect the relative movement between the flow tubes and the valve assembly carried by the cage even when there is no fluid in the tubing and the tool is subjected to a high hydrostatic pressure.

It should be noted that the conventional V-packing in the seals 15, 20, 21 and 14 is placed facing both ways to resist the pressure in any direction.

As soon as a communication is established between the tubes 5 and 5', it being assumed that the tubes 5 and 8 were empty, the pressure in the zone between the swabs 44 and 60 is lowered, causing the hydrostatic pressure of the heavy liquid in the well to expand the cup-shaped swabs, thereby tightly sealing the zone between the swabs from the rest of the casing.

My tool can be lowered with the tubes 8, 5 empty so that there will be no substantial hydrostatic pressure in the perforated zone, and the fluid from the well (a liquid or gas) will flow into the intermediate screen tube 54 through the ports 66, thence through the central opening 70 into the tube 71 and into the tube 7 connected at 6 to the flow tube 5'. The formation fluid will be effectively sealed from the heavy liquid in the casing pipe by the double swab 76.

To shut off the flow, the tubing is lowered, separating the upper and the lower circulating ports 31, 32 of the valve. The ports 30 will then be opened, equalizing the pressure inside and outside the swabs. The latter will resiliently contract so that the tool can be moved in the casing without any danger of damaging the rubber swab cups. The tubing 8 is screwed into the bushing 10 and the valve with the testing tool raised to a new testing level or entirely out of the well.

It should be noted that with my construction it is possible to make the flow annulus in the valve of a greater cross sectional area than the flow tube so that there will not be any undue loss by friction in the valve.

For greater safety, when very heavy hydrostatic pressures are encountered, each swab cup 44, 60 may be replaced by two similar cups side by side.

It is evident that my valve can be used for various other purposes in pipes through which flow various fluids. The friction blocks 35 may be removed and the ports 30 eliminated, if not needed.

My testing tool and valve have important advantages, including the fact that the tubing 5 and 8 can be lowered empty so that no swabbing will be necessary for starting the flow of formation fluid from the perforated zone; also that it will not be necessary to plug off each successive zone after testing before starting to test the next higher zone. Such a practice, usually employed with conventional testing tools, causes much delay and expense, first in plugging the casing, then in re-drilling the plugs. Moreover, there is always the possibility that the plug may leak so that a fluid from a previously tested zone will be mixed with the one being tested.

With my testing tool such a mixing of fluids is practically impossible, and if through some defect in the tool a leakage develops between the swabs and the casing, this fact will be immediately noticed by the lowering of the fluid level in the casing due to the penetration of the liquid into the flow tube.

Thus, with my production testing tool it is possible rapidly and accurately to test all the horizons desired and then, if water or other fluids such as gas are found in certain zones which are not wanted at the time, such zones can be excluded by squeeze cementing, using for instance, my cementing tool as described in my co-pending patent application Serial No. 516, 009, filed December 29, 1943, now patent No. 2,426,164 issued August 26, 1947.

A modified testing tool is shown in Fig. 7. It is used with the valve shown in Fig. 1 in the same manner as the tool shown in Fig. 4. By-pass ports 79 equalize the pressure at either side of the swab rubbers when the tool is being lowered or raised with the valve closed. When the valve is opened, fluid from the zone between the swabs will flow first through perforations 80 in an outer screen 81, then through an inner flow tube 82 into the upper flow tube 83 connected to the valve in the same manner as the pipe 7 of the tool shown in Fig. 4.

The outer screen sleeve 81 is welded at 84 to the flow tube 83. The lower end of the sleeve 81 is closed by a flange 85 slidably fitted over the tube 83.

The form shown in Fig. 7 is particularly suitable for casing of large diameters.

Figure 8:
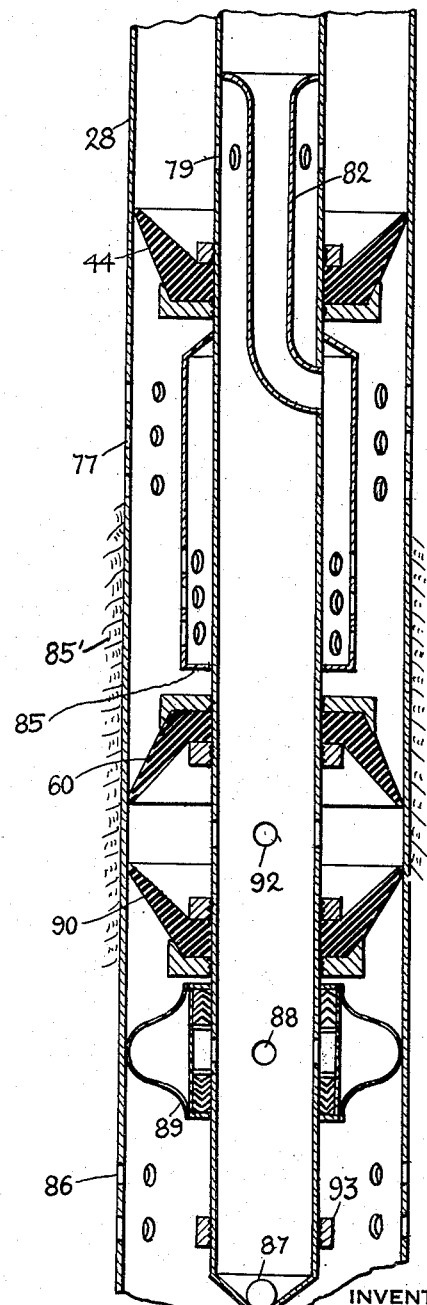
Fig. 8 is a similar view of another modification of the testing tool.

Another modification is shown in Fig. 8, especially designed to prevent any leakage of the fluids into the zone between the sealing swabs 44 and 60 from other zones through the space outside the casing, especially if the sealing cement 85' outside the casing pipe between gun-perforated zones 77 and 86 becomes weakened. The fluid pressure in this form of my device is equalized by the ball valve 87 which is automatically opened when the tool is being lowered, the fluid passing upward through the upper equalizing ports 79. When the tool is being pulled out, an equalizing port 88 is opened by a frictional slide valve 89, thus again establishing a free flow of the fluid through the device. A collar 93 limits the downward relative movement of the valve 89.

An additional seal for the zone under test is provided by a swab cup 90 under the swab 60 with a port 92 between them in the flow pipe 83. With the slide valve closed, a pressure can be applied in the casing which is transmitted to the swabs 60, 90 firmly sealing them against the casing. Due to the arrangement of the ball valve 87, this excessive pressure cannot be applied to the zones below the tool thus protecting them from any difficulties which the high pressure may cause.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

The following is claimed as new:

1. A production testing device for a well substantially filled with liquid comprising a conduit extending into the well bore to a point adjacent a formation whose production is to be tested, a pair of axially spaced cup shaped sealing swabs carried on the exterior of and surrounding said conduit and disposed one above and one below a perforate section of said conduit, said swabs oppositely disposed with their lips extending away from each other and adapted to sealingly engage the interior of the well wall above and below the formation to be tested to isolate such formation from and against the hydrostatic pressure of the liquid within the well and exteriorly of the conduit above the upper and below the lower swab, said device being positioned in the well with said swabs being spaced one immediately above and one immediately below the formation to be tested, a by-pass means extending through the interior of said conduit between said swabs and opening to the exterior of said conduit at each end of the by-pass means above the upper swab and below the lower swab and communicating the well bore outside said conduit above the upper of said swabs with the well bore below the lower of said swabs, and valve means interposed in said conduit and operable for alternatively and selectively communicating the well bore outside said conduit between said swabs with the well bore outside said conduit above the upper of said swabs or with the interior of said conduit above said valve means.

2. A method of testing the productivity of a selected intermediate formation interval exposed in a well containing a continuous column of fluid, the hydrostatic pressure of which fluid is sufficient to prevent the inflow of formation fluids from all exposed formations into said well, which comprises isolating the said selected exposed intermediate formation interval and reducing the hydrostatic pressure exerted against the face of said selected exposed formation interval to a value less than the pressure exerted above and below such interval, and sufficiently to induce flow from said selected formation interval while maintaining the full hydrostatic pressure of said fluid on the formations exposed in the well above and below such interval, and also while maintaining the continuity of said column of fluid, and conducting production from said selected interval through an open conduit extending from the face of said selected interval to the surface, in a stream isolated from said column of fluid.

CHRISTIAN W. BREUKELMAN.

References Cited in the file of this patent

UNITED STATES PATENTS

| Number | Name | Date |
|---|---|---|
| 2,055,515 | Yarbrough | Sept. 29, 1936 |
| 2,186,488 | Johnston et al. | Jan. 9, 1940 |
| 2,227,731 | Lynes | Jan. 7, 1941 |
| 2,301,624 | Holt | Nov. 10, 1942 |
| 2,327,610 | Savitz | Aug. 24, 1943 |
| 2,341,832 | Verheul et al. | Feb. 15, 1944 |
| 2,404,876 | Granger | July 30, 1946 |
| 2,426,164 | Breukelman | Aug. 26, 1947 |
| 2,466,305 | Costello | Apr. 5, 1949 |